Aug. 4, 1964   J. J. ROBSON ETAL   3,143,157
UNIVERSAL RIM
Filed Nov. 27, 1961
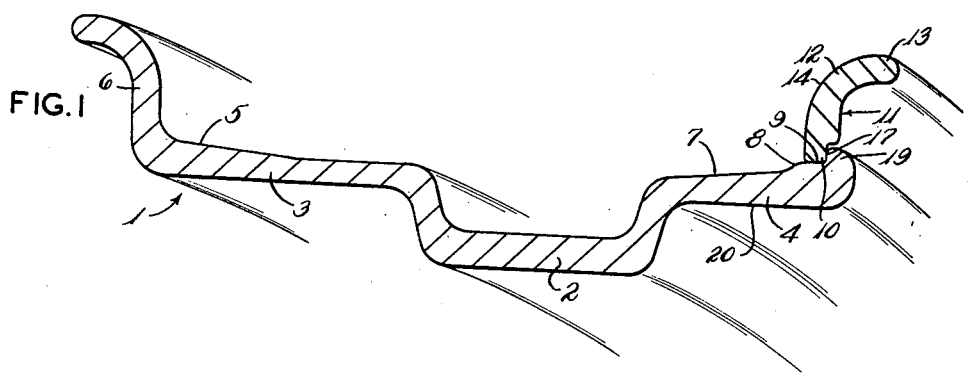
FIG.1
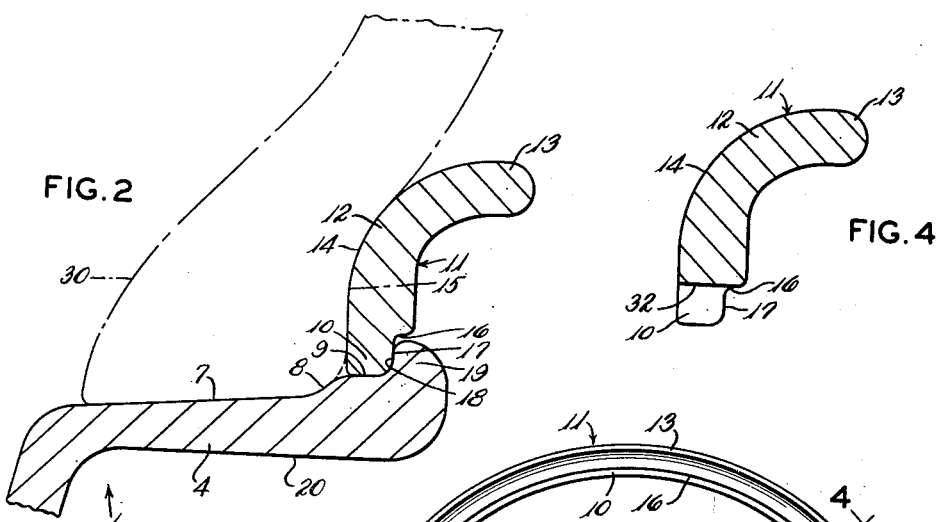
FIG.2
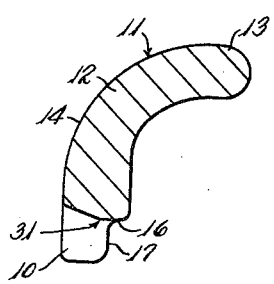
FIG.5
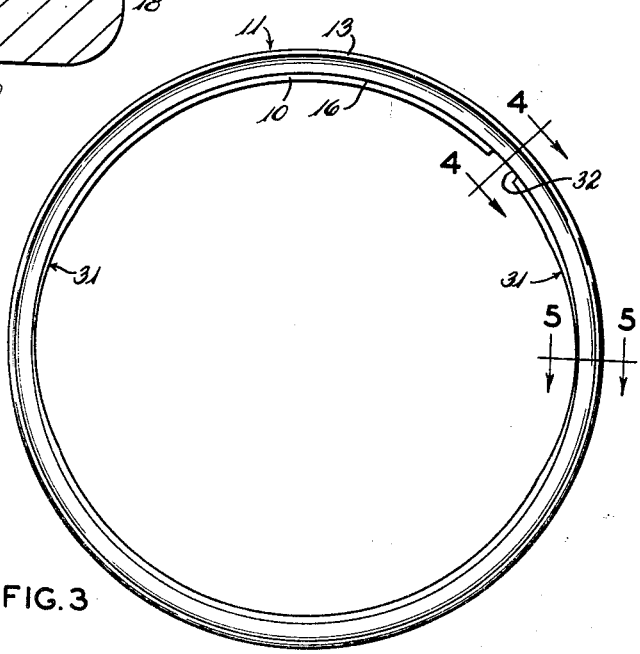
FIG.4
FIG.3

United States Patent Office 3,143,157
Patented Aug. 4, 1964

3,143,157
UNIVERSAL RIM
James Joseph Robson and Thomas Allan Robertson, Akron, Ohio, assignors to The Firestone Tire & Rubber Company, Akron, Ohio, a corporation of Ohio
Filed Nov. 27, 1961, Ser. No. 155,006
1 Claim. (Cl. 152—411)

The present invention is directed to an improved two-piece rim, and more specifically to a universal type of rim which may be used successfully with either tubeless tires or with tires containing tubes.

The problem has been, in the past, to develop a lightweight rim, particularly for tubeless truck tires, which will provide an air seal beneath tire beads having conventional bead profiles.

A conventional type of tire rim utilizes a demountable flange ring with a right-angle portion extending under the tire bead, which flange ring is maintained in position by a lock-ring. In addition to the main rim portion and the aforementioned two rings, this construction, when used with tubeless tires, requires a rubbery O-ring to seal the inflationary air within the chamber formed by the tubeless tire and the rim. This multiplicity of parts increases the costs of manufacture and material, is time-consuming in mounting and demounting, and relies for sealing upon a rubbery gasket which may eventually take a permanent set and fail its function.

Another three-piece rim type for conventional tube-type tires employs an axially split locking ring integral with a bead-seat portion, and a separate rim-flange ring, such as shown for example in U.S. Patent No. 2,537,624. Split rings are low in hoop strength, and the split affords yet another potential air-leakage area; further, the ends of a split ring tend to rock, thus increasing chafing. Such a rim is not adapted for use with tubeless tires.

Yet another tube-type rim employs a main rim portion in combination with an axially split ring member comprising locking portion, rim flange and partial bead seat. Again, this rim is not useful for tubeless tires.

A two-piece, semi-drop-center type rim is further available, formed in one bead-seat portion with a radial trough of substantial axial width, in order to provide a recess which will allow the continuous side ring to be "buttoned" into place. This type of rim likewise has definite disadvantages: A tire bead seated on the demountable side of the rim and against the side flange ring must bridge the rather wide axial gap provided for "buttoning" of this ring. The rubbery tire bead base will eventually deform radially inwardly into this free space and take a permanent set in this new, bulged shape. Tires are not infrequently removed from their rims, for example to be inspected or for retreading, and thereafter remounted on the rims. The presence, in such cases, of this deformed tire bead-base area, will often make it impossible to reseal such a tire in an airtight manner on its rim, since it is next to impossible to assure that the deformation can again be exactly mated into the recess. The presence of this trough, at the same time, reduces the rim bead seat area available for tire bead support.

The trough formation in the main rim portion also necessitates the presence, in this area of the rim, of a substantial radial inward deformation of rim metal. In cases where it may be desired to fasten adapter rings at these areas, or where these rims are to be used with special dual-mounting wheels, the radial inward protrusions on the rim will be a decided disadvantage.

It is thus an object of the present invention to provide a new type of rim, particularly for truck-, bus-, and heavy-duty applications, which may be used for either tubeless or tube-type tires without modifications or additions.

A further object of the invention is the provision of a two-piece rim which is easy and economical to manufacture, light in weight, simple to maintain, and handy for mounting and demounting of tires.

The invention further has for its object a rim on which a tubeless tire may be mounted in airtight relation without separate sealing rings or other means, while, at the same time, providing support for the bead at the removable-flange side across the full axial bead-width.

It is another object of the invention to provide a rim presenting unobstructed radially inwardly directed surfaces under the bead seats, for ease in wheel-application.

Another object of the invention is to provide a two-piece rim whose main base portion provides a flange seat having, of itself, no radially extending flange portion to engage the radial face of the bead, and presenting no radial obstacle to the tire beads as they are mounted and demounted. At the same time, the main rim portion rises slightly radially outwardly to provide some support for the tire bead heel, and merges into a seat for a circumferentially continuous, axially unbroken, demountable rim flange of substantially full height, which engages and supports the entire radial bead-face.

These and other objects and advantages will become clear from the following description of a preferred form of the invention, reference being had to the drawings, in which:

FIGURE 1 is a fragmentary sectional view of a rim in accordance with the invention;

FIGURE 2 is an enlarged fragmentary sectional view of the right hand portion of FIGURE 1 showing a tire bead thereon in dot-dash lines;

FIGURE 3 is a side elevation of the rim flange of FIGURES 1 and 2;

FIGURE 4 is a sectional view taken along line 4—4 of FIGURE 3;

FIGURE 5 is a sectional view taken along line 5—5 of FIGURE 3.

The rim of the invention is indicated generally by 1 and comprises a base having a semi-drop-center portion, or well, 2, and bead support portions generally indicated at 3 and 4; these comprise bead seats sloping at a conventional angle of about 5°. In the embodiment shown, bead seat 5 merges into a radially extending, integral rim flange 6. Near the axially outer portion of bead seat 7, the surface thereof rises quite rapidly for a short distance, as indicated at 8, in the area intended to be engaged by the heel of the tire bead. In FIGURE 2, the dotted outline of a tire bead shows its seating relationship with this bead seat.

Beyond the raised portion 8, there is provided a generally axial surface 9 which provides a radial support seat for the radially inner end 10 of the circumferentially continuous, demountable rim flange 11. The rim flange 11 comprises in the main a radial portion 12 merging into an outwardly curving end portion 13. The axially inner face 14 of the flange 11 is adapted to engage the axially outer face 15 of the tire bead 30. The inner face 14 of the rim flange 11 extends unbroken radially to the main rim portion in the vicinity of the tire bead heel. The radial inner end 10 of the rim flange is undercut as at 16 to form a radial face 17. The flange 11 is locked in position axially on the main rim portion by engagement with a radial surface 18 on ledge 19 at the end of bead-support portion 4.

At the undercut 16, a slight clearance is provided between the rim flange and the ledge 19, to allow easier seating of the flange on the rim without interference.

By this novel rim flange-and-flange seat construction, it will be seen that there is formed a cylindrical surface 20 underneath the bead seat support portion 4. The diameter of this surface can thus be equal to the diameter under the other bead support portion 3, making possible the application and use of similar adapters on either side of the rim.

It will be noted that the main rim surfaces 7, 8, 9 and 18 form an outer rim portion which provides support for the bead heel and for the demountable rim flange 11 without obstructing the mounting and demounting of the tire beads. In so doing, there is also provided an inwardly facing cylindrical surface 20 for unobstructed adapter-placement for dual tire arrangements.

The side flange 11 is continuous and, as seen in FIGURE 2, it is of substantially full bead-support height over most of its circumferential extent. The inner diameter of the flange is relieved at opposed locations into crescent-shaped areas 31, 31 to facilitate placement of the flange over the major diameter of the ledge 19 on the main rim portion. The flange is notched at 32 for insertion of the necessary tool to start removal of the flange from the main rim portion.

It will be seen that the invention provides a semi-drop-center rim divided circumferentially at one side into two parts only. The division line lies in the bead-heel area of the tire, so that the main rim portion comprises no radially extending bead-contacting portion, thus presenting a low profile over which the tire beads are passed for mounting on the rim. Further, there is provided a substantially full-height, circumferentially continuous, radial tire support in the form of a full-height demountable flange. In this manner, it will be seen, no division line between metal parts exists along the face of the tire bead, and thus no problem of bead chafing will arise.

The rim is additionally unobstructed under the bead support portions for greater flexibility in choice of wheels and adapter rings.

When conditions require, the rim may be comprised of a main central section and demountable flanges at both sides, according to this invention.

Although a preferred form of the invention has been shown and described, it will be clear that modifications may occur to those skilled in the art without departing from the scope of the invention as hereinafter claimed.

We claim:

A tire rim comprising
(1) an annular base,
(2) a sloping, generally axial surface at one side of said annular base adapted to sealingly engage a tire bead,
(3) an annular surface axially outwardly of said sloping surface and terminating in an abutment,
(4) a removable, endless rim flange disposed on said annular surface and against said abutment and adapted to engage the radially extending face of the tire bead,
   (a) said annular surface being of greater transverse width than the radial inner end of said rim flange, and merging into
(5) a sharply rising surface adapted to supportingly and sealingly engage the heel portion of the tire bead prior to engagement of the tire bead face with said rim flange, whereby communication between the interior of a tire mounted on said rim and the atmosphere is effectively prevented.

References Cited in the file of this patent

UNITED STATES PATENTS

| | | |
|---|---|---|
| 737,745 | Kronenberg | Sept. 1, 1903 |
| 696,779 | Gammeter | Sept. 13, 1910 |
| 1,194,285 | Gammeter | Aug. 8, 1916 |
| 2,537,624 | Brink | Jan. 9, 1951 |

FOREIGN PATENTS

| | | |
|---|---|---|
| 552,363 | Great Britain | Apr. 5, 1943 |

UNITED STATES PATENT OFFICE
CERTIFICATE OF CORRECTION

Patent No. 3,143,157　　　　　　　　　　　　　　August 4, 1964

James Joseph Robson et al.

It is hereby certified that error appears in the above numbered patent requiring correction and that the said Letters Patent should read as corrected below.

Column 4, line 33, for "696,779" read -- 969,779 --.

Signed and sealed this 17th day of November 1964.

(SEAL)
Attest:

ERNEST W. SWIDER
Attesting Officer

EDWARD J. BRENNER
Commissioner of Patents